United States Patent
Warmoth

(10) Patent No.: US 6,231,114 B1
(45) Date of Patent: May 15, 2001

(54) AUTONOMOUS COUNTERBALANCED BED FRAME ASSEMBLY FOR TRAILERS HAVING COUNTERBALANCE MEANS PUSHING TOWARD A REAR WALL OF THE TRAILER

(76) Inventor: Mark Warmoth, 30337 Big River Dr., Canyon Lake, CA (US) 92587

( * ) Notice: Subject to any disclaimer, the term of this patent is extended or adjusted under 35 U.S.C. 154(b) by 0 days.

(21) Appl. No.: 09/437,963

(22) Filed: Nov. 10, 1999

(51) Int. Cl.[7] .............. B60P 3/00; A47C 17/40; A47C 17/84; A47C 17/64
(52) U.S. Cl. .............. 296/170; 296/190.02; 5/118; 5/10.2; 5/164.1
(58) Field of Search .............. 296/170, 190.02, 296/24.1; 5/118, 10.1, 10.2, 9.1, 164.1

(56) References Cited

U.S. PATENT DOCUMENTS

| | | | |
|---|---|---|---|
| 3,141,178 | * | 7/1964 | Campbell .............. 5/118 |
| 3,266,062 | * | 8/1966 | Rogers .............. 5/10.1 |
| 3,480,975 | * | 12/1969 | Racine et al. .............. 5/118 |
| 3,623,168 | * | 11/1971 | Rouch .............. 5/10.1 |
| 3,745,595 | * | 7/1973 | Nagy .............. 5/9.1 |
| 3,829,907 | * | 8/1974 | Brunner .............. 5/9.1 |
| 3,829,912 | * | 8/1974 | Quakenbrush .............. 5/118 |
| 3,858,254 | * | 1/1975 | Coomes .............. 5/9.1 |
| 3,874,009 | * | 4/1975 | Nosaka et al. .............. 296/24.1 |
| 3,909,857 | | 10/1975 | Herrera . |
| 3,911,832 | * | 10/1975 | Vandergriff .............. 296/24.1 |
| 4,018,166 | * | 4/1977 | Gutridge et al. .............. 296/69 |
| 4,215,899 | * | 8/1980 | Schmidt et al. .............. 296/190.02 |
| 4,243,260 | * | 1/1981 | Gieseking .............. 296/24.1 |
| 4,279,203 | * | 7/1981 | Marulic .............. 5/9.1 |
| 4,826,235 | * | 5/1989 | Zwick .............. 296/170 |
| 5,092,650 | * | 3/1992 | Perlot .............. 296/24.1 |
| 5,377,787 | | 1/1995 | Chabrier . |
| 5,461,735 | | 10/1995 | Danton . |
| 5,598,591 | * | 2/1997 | Kelley .............. 5/118 |
| 5,638,559 | | 6/1997 | Natri et al. . |
| 5,943,714 | * | 8/1999 | Dignam .............. 5/10.1 |
| 5,984,404 | * | 11/1999 | Novoa et al. .............. 296/190.02 |

\* cited by examiner

*Primary Examiner*—D. Glenn Dayoan
*Assistant Examiner*—Hilary Gutman
(74) *Attorney, Agent, or Firm*—John Joseph Hall

(57) ABSTRACT

A movable bed frame for installation in a conventional trailer and which has a unique counterbalance system for raising the bed frame to a horizontal up or storage position and for lowering the bed frame in a horizontal down position. The counterbalance system is produced by pressurized gas pistons secured to the bed frame and to side walls of the trailer which balances the bed frame so well that a child eight years old can raise and lower the bed frame.

21 Claims, 5 Drawing Sheets

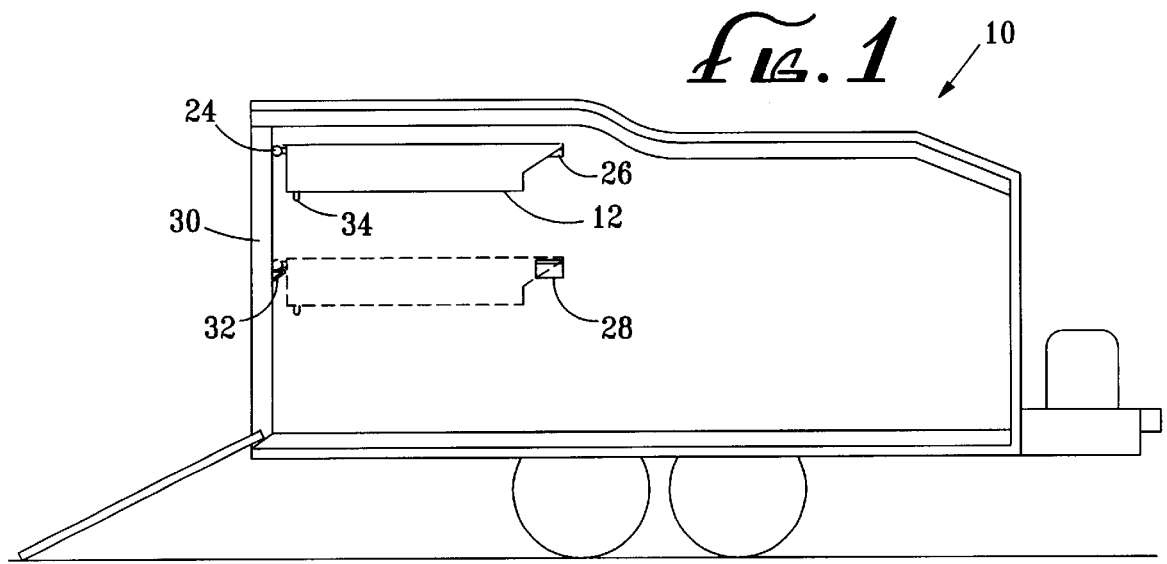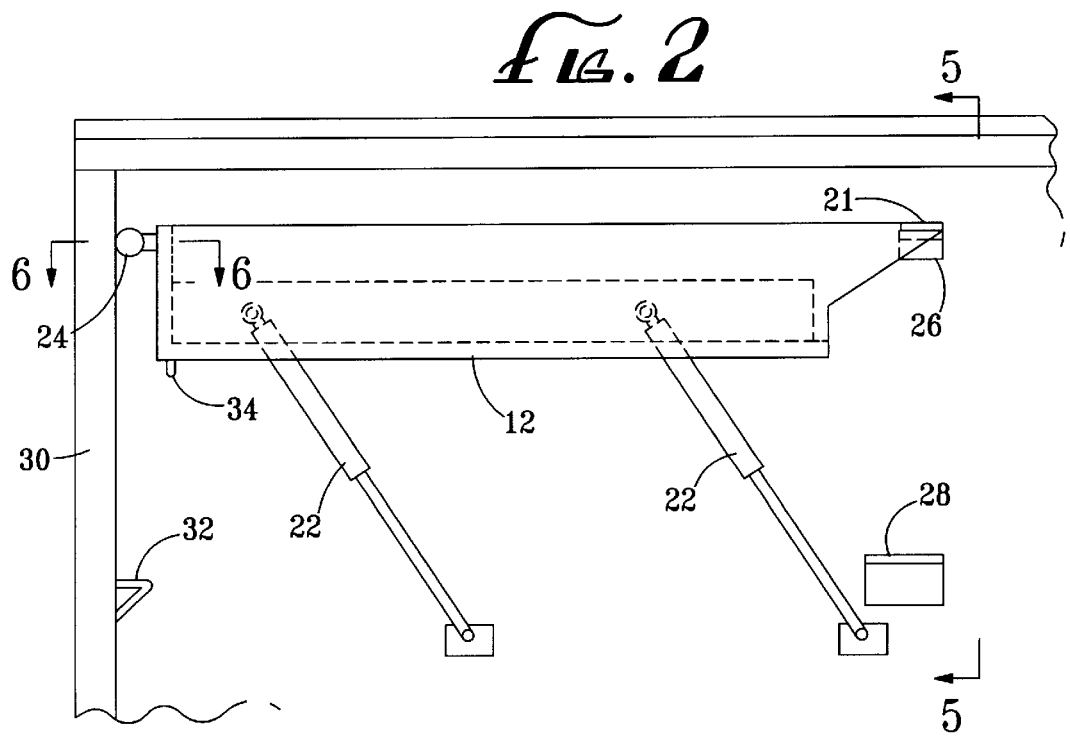

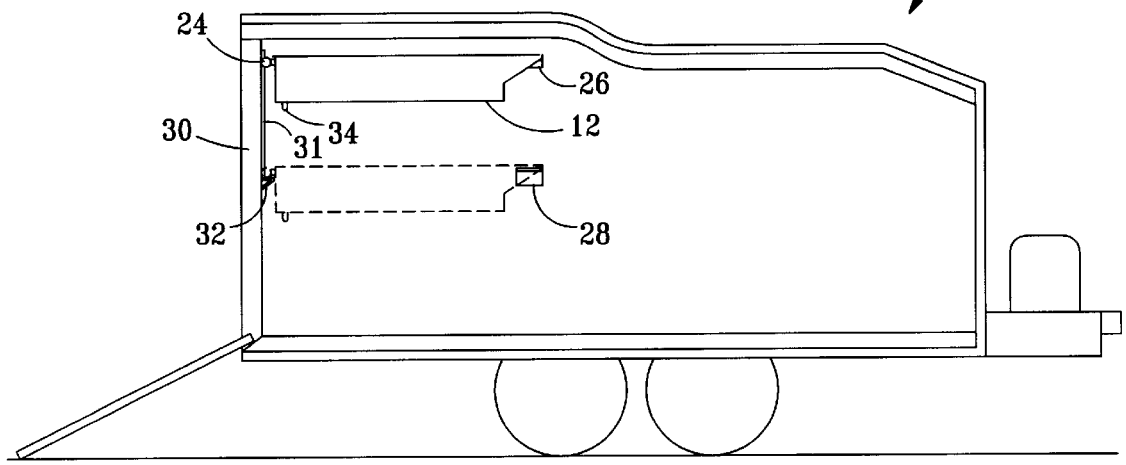
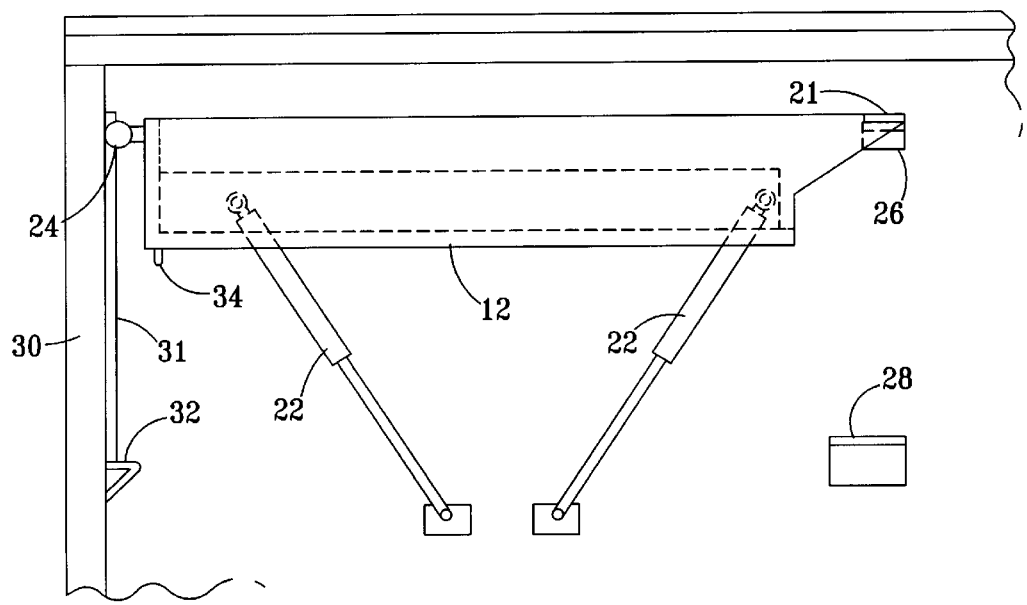

AUTONOMOUS COUNTERBALANCED BED FRAME ASSEMBLY FOR TRAILERS HAVING COUNTERBALANCE MEANS PUSHING TOWARD A REAR WALL OF THE TRAILER

BACKGROUND OF THE INVENTION

This invention relates to a bed frame for installation in a conventional trailer and having a unique counterbalance means for raising and lowering the bed frame.

There is a need for a trailer bed frame which can be installed inside a conventional trailer with or without a mattress and easily raised to a horizontal up or storage position and easily lowered to a horizontal down position when used for sleeping persons. There is also a need for simple and easy means for counterbalancing the bed frame, so that even an eight year old child will be able to raise or lower the bed frame and for the means to be made up of relatively simple and inexpensive component parts readily available. Another need is for the bed frame to be adjustable in size so that mattresses ranging from twin size to king size may be accommodated without adversely affecting the operation of the bed frame.

Applicant is unaware of any prior art providing for a bed frame which can be installed in a conventional trailer and which is provided with counterbalance means allowing a child to raise or lower the bed frame and is made from readily available component parts and accepts a range of mattresses from twin size to king size.

OBJECTS OF THE INVENTION

It is, therefore, an object of the invention to provide a bed frame for installation in a conventional trailer and which can be easily raised to a horizontal up or storage position and easily lowered to a horizontal down or sleeping position.

Another object of the invention is to provide a bed frame for installation in a conventional trailer and which has counterbalance means for easy movement of the bed frame in an up or down direction.

A further object of the invention is to provide a bed frame for installation in a conventional trailer which has counterbalance means that allows an eight year old child to move the bed frame in an up or down position.

A still further object of the invention is to provide a bed frame for installation in a conventional trailer and which can be made from readily available component parts.

A yet further object of the invention is to provide a bed frame for installation in a conventional trailer and which accepts a range of mattresses from twin size to king size due to adjustment of the size of the bed frame and due to varying the counterbalance means.

BRIEF DESCRIPTION OF THE DRAWINGS

FIG. 1 is a side elevational view illustrating an embodiment of the invention in its horizontal up or storage position and with dotted lines in a horizontal down position in a conventional trailer.

FIG. 2 is a side elevational view illustrating an embodiment of the invention in its horizontal up or storage position against a broken away portion of the inside back wall of a trailer.

FIG. 8 is a side elevational view illustrating another embodiment of the invention in its horizontal up or storage position and with dotted lines in a down position in a conventional trailer.

FIG. 9 is a side elevational view illustrating another embodiment of the invention in its horizontal up or storage position against a broken away portion of the inside back wall of a trailer.

DETAILED DESCRIPTION OF PREFERRED EMBODIMENTS

Figure 3:
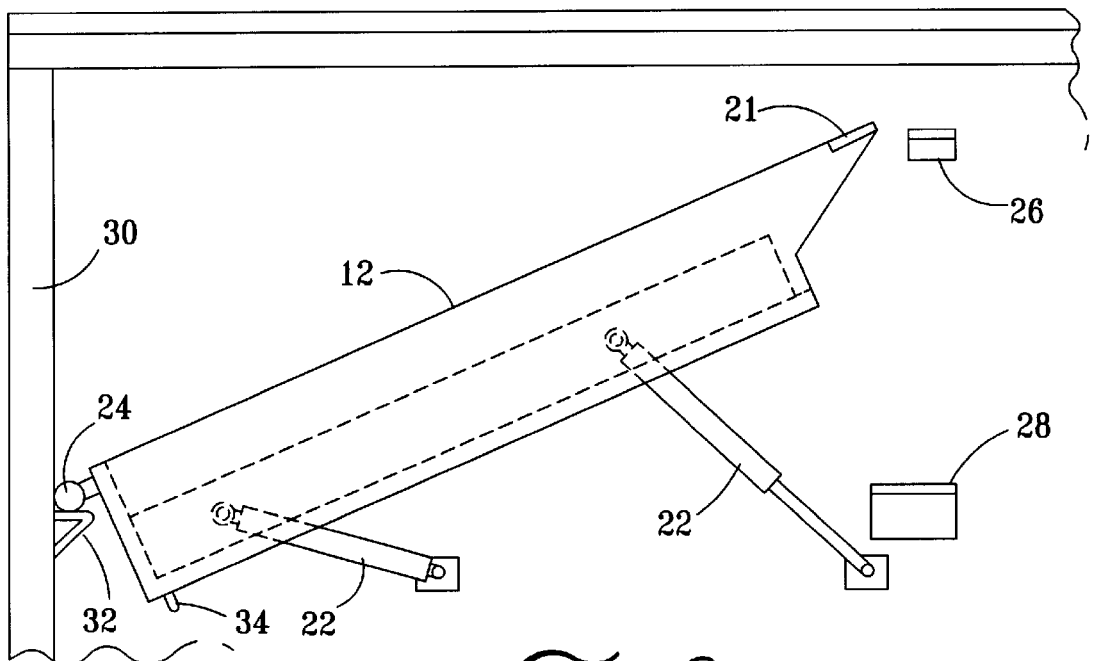
FIG. 3 is a side elevational view illustrating an embodiment of the invention in a transitional position inside a trailer having its back wall broken away.
Figure 4:
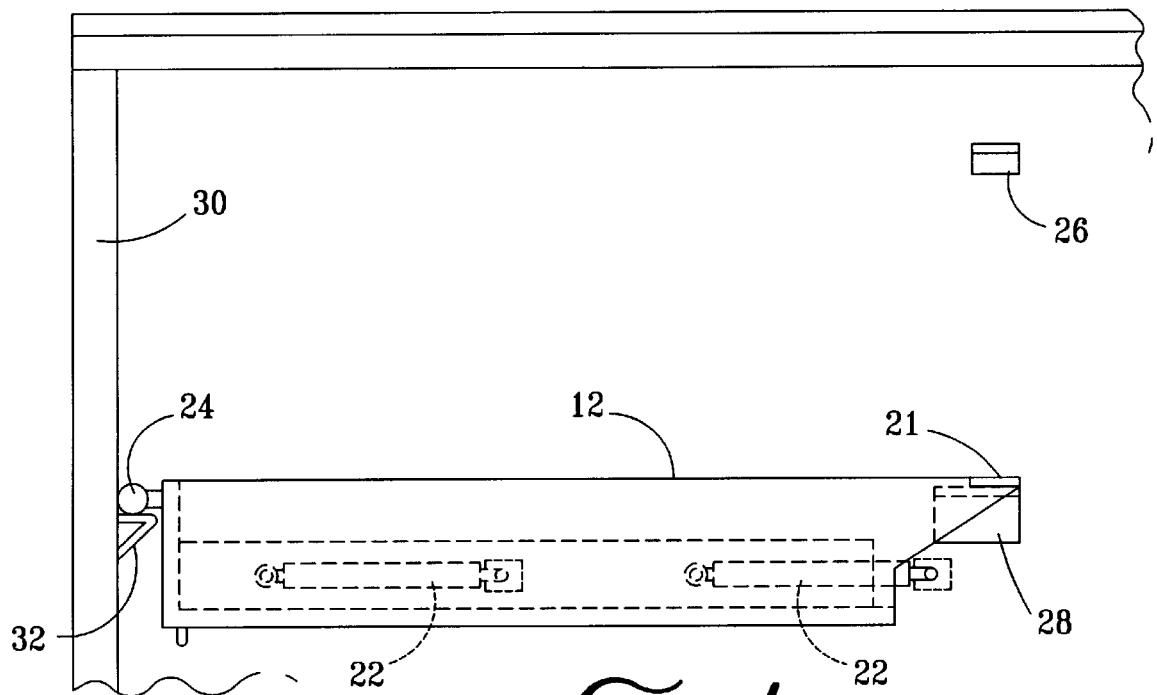
FIG. 4 is a side elevational view illustrating an embodiment of the invention in its horizontal down position inside a trailer.
Figure 5:
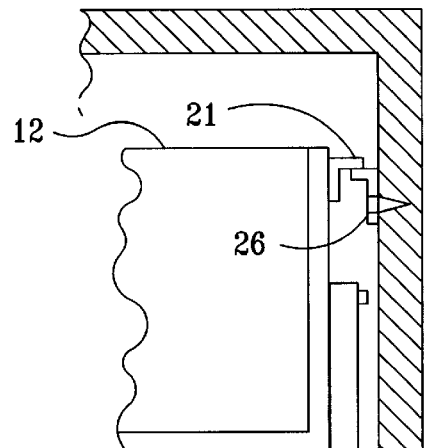
FIG. 5 is a front cross sectional view taken along line 5—5 of FIG. 2 of an embodiment of the invention and illustrates the right pivot and right anchor points of the counterbalance means.
Figure 6:
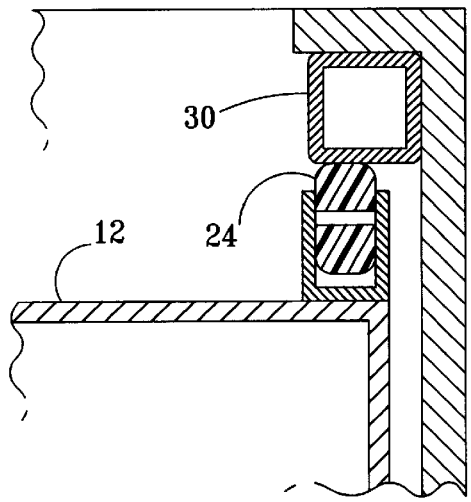
FIG. 6 is a cross sectional view taken along line 6—6 of FIG. 2 and illustrates the left stop and left rear guide of an embodiment of the invention.
Figure 7:
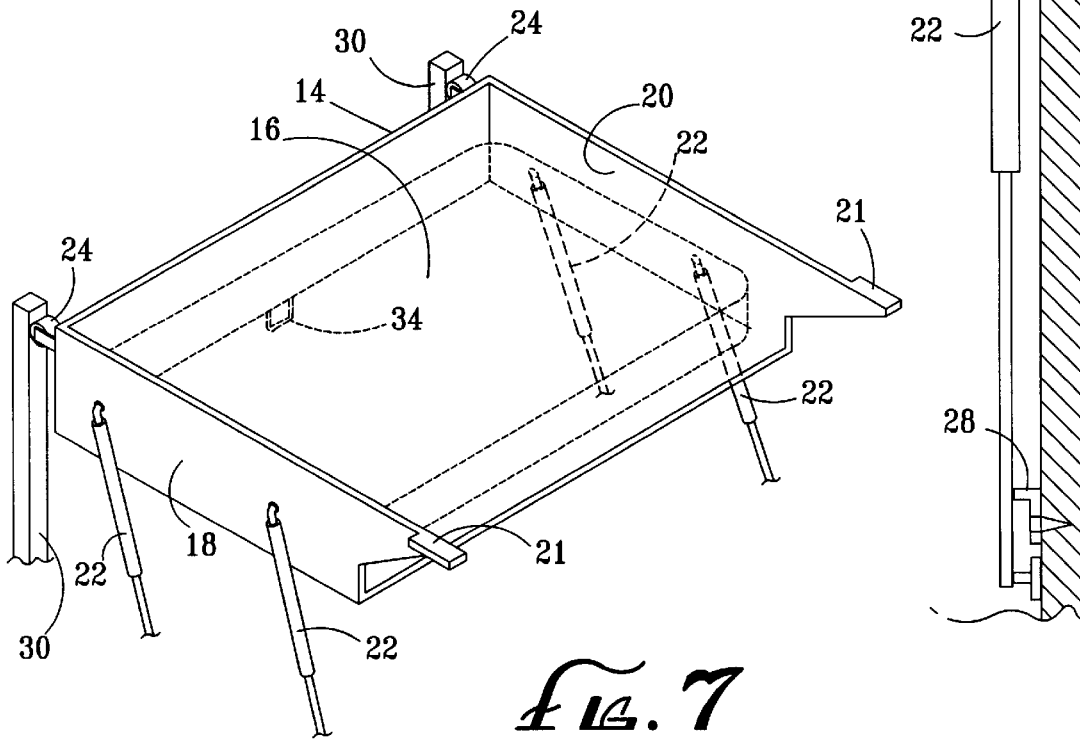
FIG. 7 is a perspective view of an embodiment of the invention in its horizontal up position for storage and shows a mattress therein with dotted lines.
Figure 10:
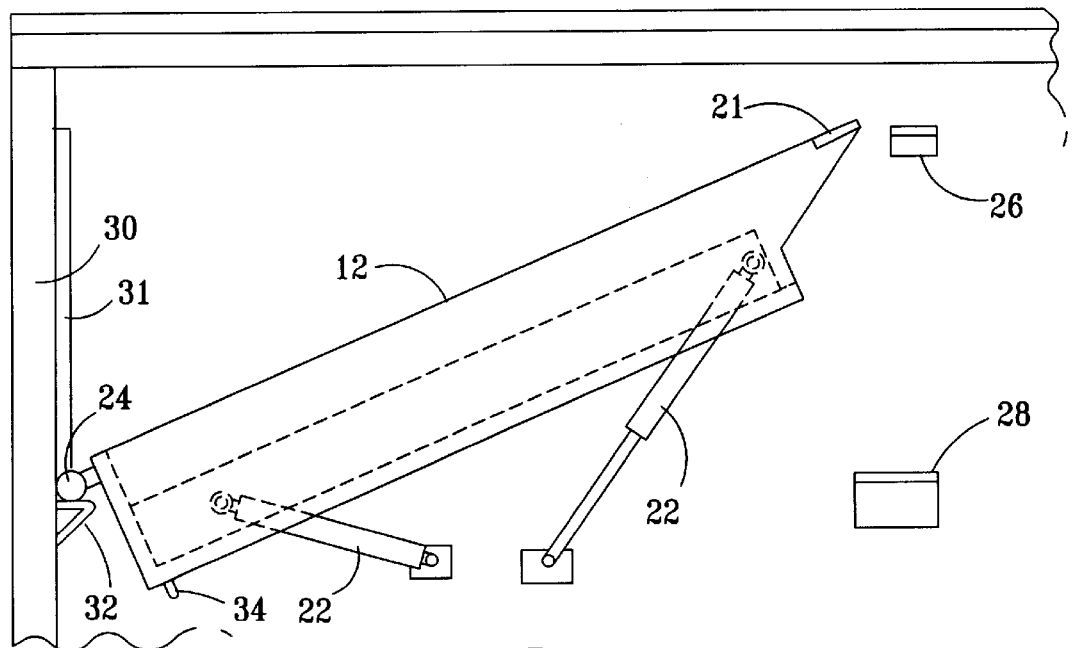
FIG. 10 is a side elevational view illustrating another embodiment of the invention in a transitional position inside a trailer having its back wall broken away.
Figure 11:
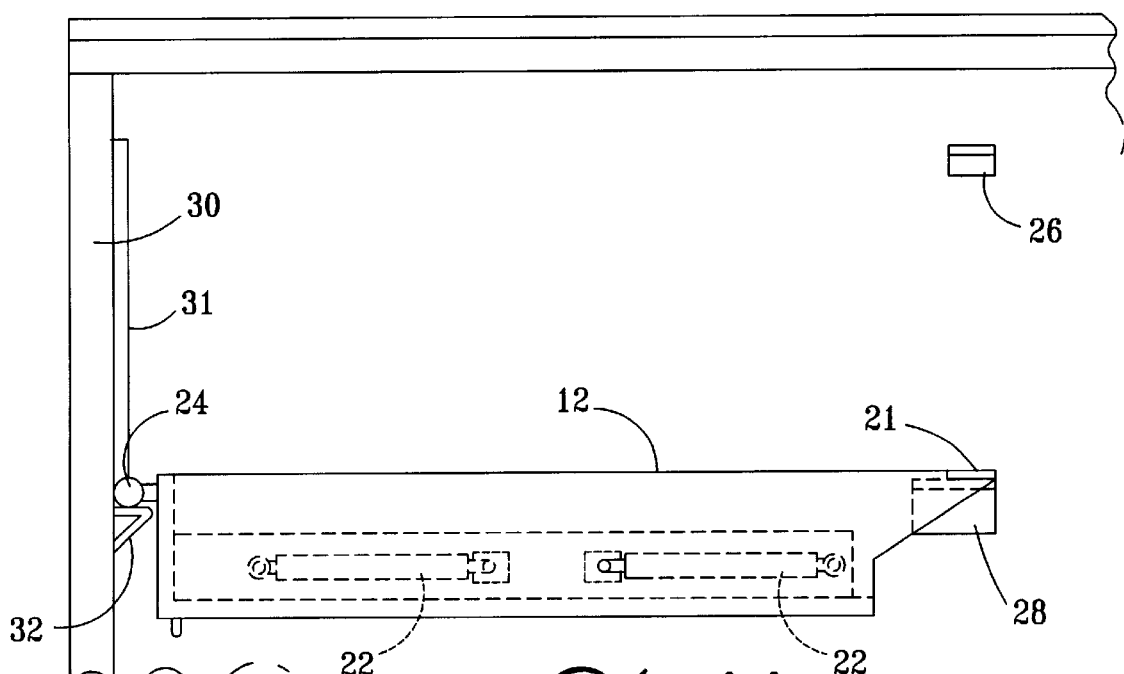
FIG. 11 is a side elevational view illustrating another embodiment of the invention in a horizontal down position inside a trailer.

A conventional trailer 10 has installed in it the trailer bed frame 12, which has a side board member 14 and its other side open to receive a mattress or storage items. Trailer bed frame 12 has a bottom board member 16, a rear board member 18, and a front board member 20. These component parts of the bed frame 12 are solidly joined together by any conventional means and can be made from any suitable wood material, such as plywood, that is sufficiently strong to support the weight of a mattress and persons sleeping on the mattress.

The front ends of rear board member 18 and front board member 20 are formed into support members 21 for support of the bed frame 12 in its up or down position.

The bed frame 12 is provided with counterbalance means comprising a set of four pressurized gas counterbalance pistons 22, of which two are pivotally secured at their top ends to rear board member 18 and two are pivotally secured at their top ends to front board member 20 of the bed frame 12. Each counterbalance piston 22 is pivotally secured at its bottom end to the side walls of trailer 10. All the counterbalance pistons 22 push toward the rear wall of trailer 10.

The gas pressure in the counterbalance pistons 22 may be varied as needed to accommodate various weights of bedframes 12. Thus, for bed frames weighing from 80 to 100 pounds, counterbalance pistons having gas pressure of 100 pounds may be used. For bed frames weighing from 100 to 120 pounds, counterbalance pistons having gas pressure of 120 pounds may be used. For bed frames weighing from 110 to 130 pounds, counterbalance pistons having gas pressure of 130 pounds may be used. For bed frames weighing from 120 to 140 pounds, counterbalance pistons having gas pressure of 140 pounds may be used.

Further variations in the counterbalance means can be made by relocating the position of the counterbalance pistons 22.

For a queen size bed frame 12 having an overall length of about 71 inches, the counterbalance pistons 22 are located as follows:

The bottom ends of counterbalance pistons 22 are located about 61¾ inches above the floor of the trailer 10. The two counterbalance pistons 22 of rear board member 18 and front board member 20 closest to the rear wall of trailer 10 may be referred to as rear counterbalance pistons 22 and their top ends are pivotally mounted on bed frame 12 at a position about 9 inches from the rear wall of the trailer 10 as shown in FIG. 3. The other two counterbalance pistons 22 respectively of rear board member 10 and front board member 20 may be referred to as front counterbalance pistons 22 and their top ends are pivotally mounted at a position on bed frame 12 about 46 inches from the top ends of the two rear counterbalance pistons 22.

The bottom ends of the two rear counterbalance pistons 22 are respectively pivotally mounted on opposite side walls of the trailer 10 at a position about 25½ inches from the rear wall of the trailer 10. The bottom ends of the two front counterbalance pistons 22 are respectively pivotally mounted on opposite side walls of the trailer 10 at a location about 71⅝ inches from the rear wall of the trailer 10.

The counterbalance pistons 22 have an extended length of about 29¾ inches and a closed or collapsed length of about 17¼ inches. A suitable counterbalance piston is Model No. C16-19974-16-4-365-325-A11-B11-400 N produced by Suspa, Inc. of Grand Rapids, Mich.

For different sizes of bed frames, the above locations can be varied as needed, so long as the counterbalance pistons 22 are kept in parallel relationship to each other.

Roller members 24 are attached at the top of each end of side board member 14.

Upper ledge members 26 are located about 6½ inches below the ceiling of the trailer 10 and are attached on each opposite side wall of the trailer 10 to support the support members 21 of bed frame 12 in its up or storage position.

Lower ledge members 28 are located about 34¼ inches below the ceiling of trailer 10 and attached on each opposite side wall of trailer 10 to support the support members 21 of bed frame 12 in its down or sleeping position.

For easy movement of bed frame 12 up or down, roller members 24 bear against each end member 30 of the back wall of trailer 10.

In a second embodiment of the invention as shown in FIGS. 8 through 11, each end of the rear wall of trailer 10 has track guide means 31 to guide roller members 24 when bed frame 12 is moved.

Lower stop members 32 are located 34¼ inches below the ceiling of the trailer 10 and attached at each end of the back wall of the trailer 10 to limit downward travel of the bed frame 12.

Strap means 34 is attached to the underside of bottom board member 16 to begin operation of the bed frame 12.

In the second embodiment of the invention shown in FIGS. 8 through 11, the component parts and location and arrangement of counterbalance pistons 22 have not been changed except for the location of the bottom ends of front counterbalance pistons 22. These bottom ends of front counterbalance pistons 22 are respectively pivotally mounted on opposite side walls of the trailer 10 at a location about 37 inches from the rear wall of the trailer 10, thereby maintaining a distance from the bottom ends of rear counterbalance pistons 22 of about 12 inches.

As in the first embodiment, the second embodiment of the invention has two rear counterbalance pistons 22 which push toward the back wall of the trailer 10. However, the second embodiment has two front counterbalance pistons 22 which push to the front due to the new location of their bottom ends, which achieves the same result of offsetting the weight of the bed frame 12 and any mattress in it as achieved by the first embodiment of the invention.

In operation, when the bed frame 12 has been installed in the trailer 10, and placed in the horizontal up or storage position, a pull on strap means 34 will lift the right end of bed frame 12 off from upper ledge members 26 and bed frame 12 will assume the position shown in FIG. 3. The counterbalancing effect of the counterbalance pistons 22 will require only a moderate pull on strap means 34 to begin the downward travel of bed frame 12. Once the downward movement begins, the bed frame 12 will gently arrive and be stopped at lower stop members 32 and lower ledge members 28 in a horizontal position. A child of 8 years is able to accomplish the downward movement of the bed frame 12 due to the counterbalance means.

After use as desired in the down position, the bed frame 12 is pushed in an upwards direction. Again, the counterbalance means allows minimum force needed to begin the upwards movement, which an eight year old child can provide. The bed frame 12 continues in its upwards travel which is limited by the extended counterbalance pistons 22 to a horizontal position about 6½ inches below the ceiling of the trailer 10. The bed frame then is supported in its horizontal up or storage position by support members 21 resting on upper ledge members 26 and by the extended counterbalance pistons 22.

Bed frame 12 can be modified in size to receive mattresses of various sizes, and the bed frame 12 modifications range from twin size widths of 30 to 34 inches, double size widths of 48 to 54 inches, queen size width of 60 inches, and king size widths of 72 to 80 inches. The length of bed frame 12 can range from 72 to 100 inches. However, the preferred length of bed frame 12 is 96 inches which is the current distance between side walls of trailer 10.

The various locations of the counterbalance pistons 22 may be modified as needed for the various sizes of bed frame 12.

The counterbalance pistons 22 are preferably pressurized with nitrogen gas. However, other suitable gasses may be used. Other types of suitable counterbalance means include hydraulic or mechanical pistons or extension arms having the requisite counterbalancing capacity.

Although I have described the invention in detail with reference to the accompanying drawings illustrating preferred embodiments of the invention, it is understood that numerous changes may be made in the details of construction and arrangement of parts without departing from the spirit and scope of the invention as hereinafter claimed.

I claim:

1. A movable bed frame assembly installed in a conventional trailer and capable of movement to a horizontal down position and to a horizontal up position, comprising:
   (1) a bed frame having roller members attached to a rear end of the bed frame and projecting support members formed at a front end of the bed frame;
   (2) autonomous counterbalance means secured to said bed frame and to opposite side walls of said trailer and pushing toward a rear wall of said trailer and adapted for moving said bed frame from the horizontal up position to the horizontal down position and back up to said horizontal up position, said autonomous counterbalance means limiting the extent of travel of said bed frame to said horizontal up position and maintaining said bed frame in said horizontal up position;

(3) support means attached to each of the opposite side walls of said trailer to receive said projecting support members to support said bed frame in the horizontal down position;

(4) stop means attached at each end of the rear wall of said trailer to receive said roller members so as to support said bed frame in the horizontal down position; and (5) means for initiating the movement of said bed frame in a downward direction.

2. A bed frame assembly according to claim 1 in which said bed frame has one side open to receive a mattress.

3. A bed frame assembly according to claim 1 in which said autonomous counterbalance means comprises autonomous counterbalance piston members.

4. A bed frame assembly according to claim 1 in which said autonomous counterbalance means comprises autonomous pressurized gas counterbalance piston members.

5. A movable bed frame assembly installed in a conventional trailer and capable of movement to a horizontal down position and to a horizontal up position, comprising:

(1) a bed frame having roller members attached to a rear end of the bed frame and projecting support members formed at a front end of the bed frame;

(2) autonomous rear counterbalance means secured to said bed frame and to opposite side walls of said trailer and pushing toward a rear wall of said trailer, and autonomous front counterbalance means secured to said bed frame and to the opposite side walls of said trailer and pushing toward a front of said trailer, said autonomous front and rear counterbalance means being adapted for moving said bed frame from the horizontal up position to the horizontal down position and back up to said horizontal up position, said autonomous counterbalance means limiting the extent of travel of said bed frame to said horizontal up position and maintaining said bed frame in said horizontal up position;

(3) support means attached to each of the opposite side walls of said trailer to receive said projecting support members to support said bed frame in the horizontal down position;

(4) track guide means attached to each end of the rear wall of said trailer to guide said roller members;

(5) stop means attached at each end of the rear wall of said trailer to receive said roller members so as to support said bed frame in the horizontal down position; and (6) means for initiating the movement of said bed frame in a downward direction.

6. A bed frame assembly according to claim 5 in which said bed frame has one side open to receive a mattress.

7. A bed frame assembly according to claim 5 in which said autonomous counterbalance means comprises autonomous counterbalance piston members.

8. A bed frame assembly according to claim 5 in which said autonomous counterbalance means comprises autonomous pressurized gas counterbalance piston members.

9. A movable bed frame assembly installed in a conventional trailer, and capable of movement to a horizontal down position and to a horizontal up position comprising:

(1) a bed frame having a rear board member, two side board members, a bottom board member and a front board member, all of said members being solidly joined together, said front board member having a front portion provided at the top of each side with support members projecting forwardly;

(2) a roller member attached at the top of each end of said rear board member;

(3) an upper ledge member located on each opposite side wall of said trailer, said upper ledge members being adapted to receive said support members to support said bed frame when the bed frame is in the horizontal up position;

(4) a lower ledge member located on each of said opposite side walls of said trailer, said lower ledge members being adapted to receive said support members for support of the bed frame when the bed frame is in the horizontal down position;

(5) autonomous counterbalance piston members secured to said bed frame and to each of the opposite side walls of said trailer and pushing toward a rear wall of said trailer and adapted for moving said bed frame from the horizontal up position to the horizontal down position and back up to said horizontal up position, said autonomous counterbalance piston members limiting the extent of travel of said bed frame to said horizontal up position and maintaining said bed frame in said horizontal up position;

(6) a lower stop member attached to the rear wall of said trailer and located at each corner of said rear wall to limit the downwards travel of said bed frame by stopping the movement of said roller members;

(7) a strap member for initiating the movement of said bed frame in a downward direction.

10. A bed frame assembly according to claim 9 in which said bed frame has one side open to receive a mattress.

11. A bed frame assembly according to claim 9 in which said autonomous counterbalance piston members comprises autonomous pressurized gas counterbalance piston members.

12. A movable bed frame assembly installed in a conventional trailer and capable of movement to a horizontal down position and to a horizontal up position, comprising:

(1) a bed frame having roller members attached to a rear end of the bed frame and projecting support members formed at a front end of the bed frame;

(2) autonomous counterbalance piston members secured to said bed frame and to opposite side walls of said trailer and pushing toward a rear wall of said trailer and adapted for moving said bed frame from the horizontal up position to the horizontal down position and back up to said horizontal up position, said autonomous counterbalance piston members limiting the extent of travel of said bed frame to said horizontal up position and maintaining said bed frame in said horizontal up position;

(3) support members attached to each of the opposite side walls of said trailer to receive said projecting support members to support said bed frame in the horizontal down position;

(4) stop members attached at each end of the rear wall of said trailer to receive said roller members so as to support said bed frame in the horizontal down position; and (5) a strap member for initiating the movement of said bed frame in a downward direction.

13. A bed frame assembly according to claim 12 in which said bed frame has one side open to receive a mattress.

14. A bed frame assembly according to claim 12 in which said autonomous counterbalance piston members comprise autonomous mechanical counterbalance piston members.

15. A bed frame assembly according to claim 12 in which said autonomous counterbalance piston members comprise autonomous pressurized gas counterbalance piston members.

16. A movable bed frame assembly installed in a conventional trailer and capable of movement to a horizontal down position and to a horizontal up position, comprising:

(1) a bed frame having roller members attached to a rear end of the bed frame and projecting support members formed at a front end of the bed frame;

(2) autonomous rear counterbalance piston members secured to said bed frame and to opposite side walls of said trailer and pushing toward a rear wall of said trailer, and autonomous front counterbalance piston members secured to said bed frame and to the opposite side walls of said trailer and pushing toward a front of said trailer, said autonomous front and rear counterbalance piston members being adapted for moving said bed frame from the horizontal up position to the horizontal down position and back up to said horizontal up position, said autonomous counterbalance piston members limiting the extent of travel of said bed frame to said horizontal up position and maintaining said bed frame in said horizontal up position;

(3) support members attached to each of the opposite side walls of said trailer to receive said projecting support members to support said bed frame in the horizontal down position;

(4) track guide members attached to each end of the rear wall of said trailer to guide said roller members;

(5) stop members attached at each end of the rear wall of said trailer to receive said roller members so as to support said bed frame in the horizontal down position; and (6) a strap member for initiating the movement of said bed frame in a downward direction.

17. A bed frame assembly according to claim 16 in which said bed frame has one side open to receive a mattress.

18. A bed frame assembly according to claim 16 in which said autonomous counterbalance piston members comprise autonomous mechanical counterbalance piston members.

19. A bed frame assembly according to claim 16 in which said autonomous counterbalance piston members comprise autonomous pressurized gas counterbalance piston members.

20. A movable bed assembly for installation in a conventional trailer and capable of movement to a horizontal down position and to a horizontal up position, comprising:

(1) a bed frame having a front end, a rear end, roller members attached to said rear end, and projecting support members formed at said front end; and (2) autonomous counterbalance piston members secured to said bed frame and for attachment to opposite side walls of said trailer and for pushing toward a rear wall of said trailer and adapted for moving said bed frame from the horizontal up position to the horizontal down position and back up to said horizontal up position, said autonomous counterbalance piston members limiting the extent of travel of said bed frame to said horizontal up position and maintaining said bed frame in said horizontal up position.

21. A movable bed frame assembly for installation in a conventional trailer and capable of movement to a horizontal down position and to a horizontal up position, comprising:

(1) a bed frame having a front end, a rear end, roller members attached to said rear end, and projecting support members formed at said front end; and (2) autonomous rear counterbalance piston members secured to said bed frame and for attachment to opposite side walls of said trailer and for pushing toward a rear wall of said trailer, and autonomous front counterbalance piston members secured to said bed frame and for attachment to the opposite side walls of said trailer and for pushing toward a front of said trailer, said autonomous front and rear counterbalance piston members being adapted for moving said bed frame from the horizontal up position to the horizontal down position and back up in said horizontal up position, said autonomous counterbalance piston members limiting the extent of travel of said bed frame to said horizontal up position and maintaining said bed frame in said horizontal up position.

\* \* \* \* \*